T. C. THEAKER.
Railroad Car Axles.
No. 137,977.  Patented April 15, 1873.
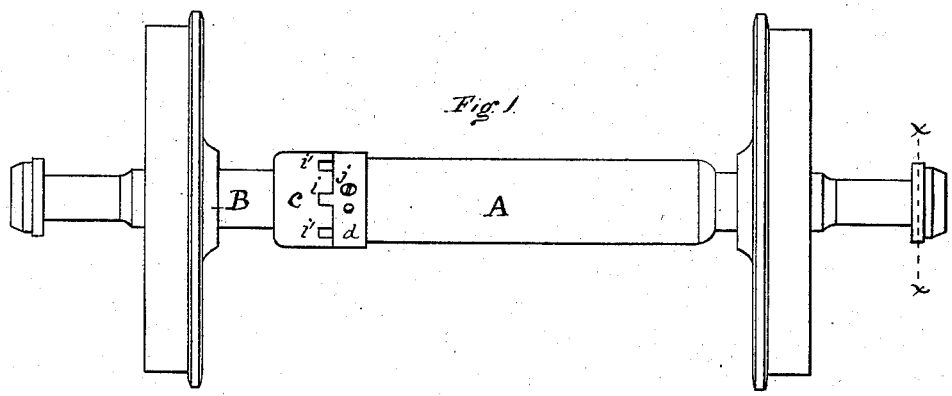
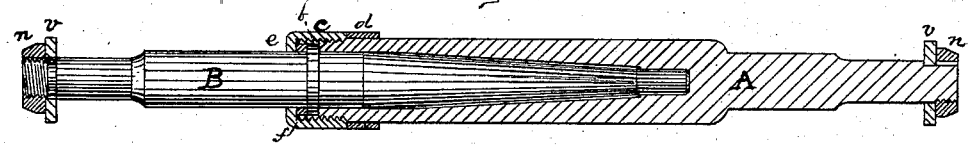
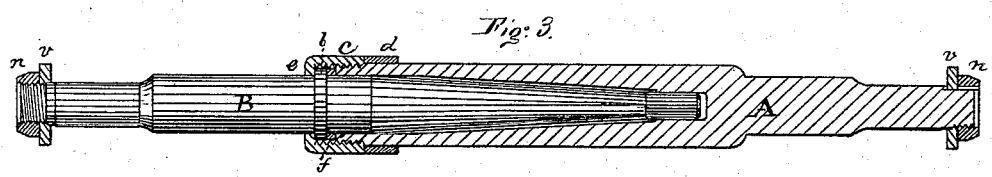
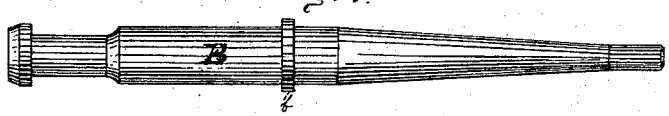
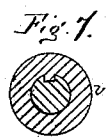
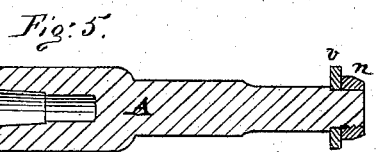
Witnesses.  Inventor.

UNITED STATES PATENT OFFICE

THOMAS C. THEAKER, OF NEW YORK, N. Y.

IMPROVEMENT IN RAILROAD-CAR AXLES.

Specification forming part of Letters Patent No. 137,977, dated April 15, 1873; application filed April 3, 1873.

*To all whom it may concern:*

Be it known that I, THOMAS C. THEAKER, of the city of New York, in the county and State of New York, have invented certain Improvements in Railroad-Car Axles and Wheels, of which the following is a specification:

The first part of my invention relates to devices for allowing the two wheels on the same axle to rotate independently of each other when running on a curve, or when from any other cause one wheel is required to revolve faster than its fellow to obviate its tendency to slip upon the rail, which slipping is inevitable on running a curve, unless provision be made for the independent rotation of the wheels. The second part of my invention relates to devices for adjusting the wheels to suit a change of gage in the track.

In the accompanying drawing, Figure 1 is an elevation of a pair of wheels mounted upon an axle made in pursuance of my invention. Fig. 2 is a longitudinal section of said axle. Fig. 3 is a similar section with the axle extended so as to conform to a broader gage. Figs. 4 and 5 show the two parts A and B of the axle detached, and Fig. 7 a section through the end of the axle on line $x\ x$ of Fig. 1.

The axle is made in two parts, A and B, so secured together that each may rotate independently of the other, as hereinafter more particularly described. The part A is made tubular from its inner end to a point as near the wheel as is conveniently practicable. The bore in this tubular portion is made conical or tapering toward the wheel, except about five or six inches at each end, which portions are cylindrical. The part B from the collar $b$ to its inner end is made of corresponding form, and fits into the tubular portion of A, but not so tightly as to prevent it from rotating therein. The cylindrical portions of this part of B constitute its journals, and the corresponding cylindrical portions of the tube constitute the bearings of said journals. The part B is encircled by an annular collar, $b$, against which the open end of the tube A fits when the two parts of the axle are connected together. This annular collar is embraced by a screw-cap, $c$, having an inwardly-projecting annular flange, $e$, fitting down around the axle outside of the collar, and a female screw in its interior surface, which engages with a male screw on the end of the tubular portion of A. When said cap $c$ is screwed down upon the end of said tube the two parts of the axle are held firmly together, yet the part B will turn within the tube, or the tube will turn upon the part B whenever from running a curve or from any other cause it becomes necessary for one wheel to rotate faster than the other, to obviate slipping upon the rail. To prevent the cap $c$ from unscrewing, I employ a metal ring-clutch or "keeper," $d$, which fits snugly on the end of the tubular portion of A, but not so tightly but that it will slide back and forth thereon. This ring is provided with a tooth, $i$, which will fit into any one of a series of notches, $i'$, in the edge of the screw-cap $c$, and is held firmly in position by a screw, $j$, passing through said ring, and screwing into a hole in the tube A; or, instead of being annular, said keeper may be a mere segment of a ring. As the thread of the screw by which the cap $c$ is attached to the tube is designed to be one-eighth of an inch, it follows that one rotation of said screw-cap will move it longitudinally upon the tube one-eighth of an inch; and if there are eight notches in said cap equidistant from each other, the turning of the cap so that the tooth $i$ will engage with the next adjacent notch will move said cap longitudinally but one-sixty-fourth part of an inch; but to provide for a nicer adjustment, I make two holes in the ring-clutch or keeper just half as far apart as the notches are in the cap $c$; and by changing the screw $j$ from one of these holes to the other I can turn the cap $c$ and secure it by the keeper so that its longitudinal movement will be but one-one-hundred-and-twenty-eighth of an inch. A still more minute adjustment may be effected by increasing the number of notches in the cap $c$; and instead of one tooth on the keeper there may be several coinciding with the notches in the cap, or even as many as there are notches. The bore in the tubular portion of A is made tapering or conical, and the part of B which enters the same of corresponding form to give the necessary strength to the axle near the wheels, where strength is most needed, with as little unnecessary weight of metal as practicable.

I prefer to use with my compound axle wheels with perfectly-cylindrical treads, instead of the conical treads heretofore used.

The usual conical form of the treads is intended to cause the outer wheel on the curve to advance somewhat faster than the inner wheel, in consequence of the flange of said outer wheel pressing close up against the rail on running a curve, and the tread having its bearing upon the rail at its largest circumference, while the tread of the opposite wheel will have its bearing upon the rail at its smaller circumference. This effect can only be produced, however, by allowing considerable space between the flanges of the wheels and the rails, and this tends to give the car a lateral vibratory motion, tending to spread the rails and to break the flanges of the wheels. When, however, the wheels are allowed to rotate independently of each other, the necessity for making the treads of the wheels conical, and for any considerable space between the flanges and the rails, is obviated, and the cylindrical treads, in combination with any suitable means of allowing the wheels to rotate separately, obviate or materially diminish the tendency of the cars to vibrate laterally, and prevent any injurious lateral pressure upon the rails or upon the flanges of the wheels.

I carry into effect the third part of my invention by means of a divided annular washer, $f$, which may be placed around the part B of the axle, either on the inside or outside of the collar $b$. When it is desired to extend the axle to accommodate the wheels to a broader gage, this washer $f$ is transferred from the outer side of the collar $b$, as shown in Fig. 2, to the inner side, as shown in Fig. 3. To adapt the axle to a change of gage from four feet eight and a half inches to four feet ten inches, this washer should be an inch and a half wide, and if the difference in gage be greater or less the width of the washer must be varied accordingly. This washer is divided into two half circles to facilitate the changing of it. When the axle is extended the shoulders outside of the bearings should be spread correspondingly. This I effect by means of a washer, $v$, and a screw-nut, $n$, on the extremities of the axle. The washer $v$ is prevented from rotating on the axle, and thus turning the screw-nut, by means of a tooth or stopper projecting from its inner surface and fitting into a groove or spline in the end of the axle; or, the same effect may be produced by means of squares or flat surfaces on the axle and inner part of the washer. If the axle be extended an inch and a half, the screw-nuts $n$ on each end of the axle must be turned so as to move outwardly three-fourths of an inch each, and more or less, according to the change of gage to which the wheels are to be adjusted.

What I claim as my invention, and desire to secure by Letters Patent, is—

1. A compound axle composed of two parts, one inserted in a tubular portion of the other so as to be capable of independent rotation therein, in combination with collar $b$, screw-cap $c$, and keeper $d$, constructed and arranged to operate substantially as described.

2. The compound axle composed of two parts, A and B, the part A being forged in one solid piece, with a tubular portion conical in form, except the two cylindrical ends, which constitute the bearings of the part B when inserted therein, and the said part B of corresponding form, fitting into the tubular portion of A, and the said two parts capable of rotating independently of each other, substantially as set forth.

3. In combination with a compound axle composed of two parts, one fitting within a tubular portion of the other and capable of independent rotation therein, the collar $b$, screw-cap $c$ with its notches $i'$, and the clutch or keeper $d$ with its tooth or teeth $i$ and screw $j$, all constructed and arranged to operate substantially as described.

4. In combination with a compound axle composed of two parts, one fitting within the other, the collar $b$, screw-cap $c$, and the transferable washer $f$, to increase or diminish the extension of the axle by transferring it from one side to the other of said collar, substantially as described.

5. In combination with an extensible axle, the washer $v$ with its internally-projecting tooth or stop, (fitting into a groove in the axle,) or equivalent devices to prevent said washer from turning, and the screw-nut $n$ to extend or contract the journals to correspond with an extension or contraction of the axle, substantially as described.

In testimony whereof I have hereunto subscribed my name this 3d day of April, 1873.

T. C. THEAKER.

Witnesses:
  JOS. L. COOMBS,
  J. J. COOMBS.